(12) United States Patent
Lee et al.

(10) Patent No.: US 7,375,751 B2
(45) Date of Patent: May 20, 2008

(54) CMOS IMAGE SENSOR

(75) Inventors: Kwang-Hyun Lee, Seoul (KR); Euisik Yoon, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 695 days.

(21) Appl. No.: 10/932,025

(22) Filed: Sep. 2, 2004

(65) Prior Publication Data
US 2005/0057675 A1 Mar. 17, 2005

(30) Foreign Application Priority Data
Sep. 17, 2003 (KR) .................. 10-2003-0064377

(51) Int. Cl.
*H04N 3/14* (2006.01)
*H04N 5/335* (2006.01)
(52) U.S. Cl. ............... 348/294; 348/281; 348/302
(58) Field of Classification Search ............. 348/308, 348/294, 301, 300, 307, 241, 281
See application file for complete search history.

(56) References Cited
U.S. PATENT DOCUMENTS

| | | | | |
|---|---|---|---|---|
| 4,489,342 A | * | 12/1984 | Gollinger et al. | ........... 348/540 |
| 4,555,851 A | * | 12/1985 | Levy | ........... 33/18.1 |
| 5,162,912 A | * | 11/1992 | Ueno et al. | ........... 348/241 |
| 5,892,540 A | * | 4/1999 | Kozlowski et al. | ........... 348/300 |
| 6,031,570 A | * | 2/2000 | Yang et al. | ........... 348/300 |
| 6,469,740 B1 | * | 10/2002 | Kuroda et al. | ........... 348/308 |
| 6,507,059 B2 | | 1/2003 | Chen et al. | |

OTHER PUBLICATIONS

Pain et al. "Reset Noise Suppression in Two-Dimensional CMOS Photodiode Pixels Through Column-Based Feedback-Reset," 2002 IEEE, IEDM.

* cited by examiner

*Primary Examiner*—Lin Ye
*Assistant Examiner*—Hung Lam
(74) *Attorney, Agent, or Firm*—Oliff & Berridge, PLC

(57) ABSTRACT

Disclosed is a CMOS image sensor that controls a reset voltage to reduce reset noise caused by a reset operation of the CMOS image sensor, fixed pattern noise caused by different characteristics of detection circuits, and image lag caused by the influence of a previous image signal upon the current output signal, thereby achieving a high signal to noise ratio.

3 Claims, 3 Drawing Sheets

CMOS IMAGE SENSOR

BACKGROUND OF THE INVENTION

1. Field of the Invention

The present invention relates to a CMOS image sensor, and more particularly to a CMOS image sensor that controls a reset voltage to reduce reset noise caused by a reset operation of the CMOS image sensor, fixed pattern noise caused by different characteristics of detection circuits, and image lag caused by the influence of a previous image signal upon the current output signal, thereby achieving a high signal to noise ratio.

2. Description of the Related Art

A CMOS image sensor uses PN-junction photodiodes, which can be formed by a CMOS manufacturing process, to convert the intensity of incident light to an electrical signal. One of the most important requirements of the CMOS image sensor is a high sensitivity to the incident light.

As well known in the art, unlike the CMOS image sensor, a conventional Charge Coupled Device (CCD) image sensor detects an optical signal through charge coupling, instead of transistor switching. A photodiode, which is provided for each pixel, serves to detect light incident on the pixel, does not output an optical detection current immediately after the detection, but instead outputs the detection current after accumulating it for a certain accumulation time, so that the detection signal voltage can be raised proportional to the certain accumulation time, thereby increasing light sensitivity and decreasing noise.

FIG. 1 is a circuit diagram illustrating the configuration of each pixel circuit in a general CMOS image sensor.

A reset operation of the CMOS image sensor is a process in which a reset switch 10 is turned on to remove a photo-induced charge accumulated on a photodiode PD.

After the reset operation, a new photo-induced charge according to incident light is accumulated for a certain time, and then a selection switch 12 is turned on so that a voltage determined based on the accumulated photo-induced charge is read out through an amplifier 11 and the selection switch 12.

Three main types of noise occurring during the operation of the CMOS image sensor are reset noise, image lag noise, and fixed pattern noise. The reset noise is caused when the initial voltage becomes unstable or uncertain due to a photo-induced charge left unstably or uncertainly in the photodiode since the activation of the reset switch has failed to completely remove the photo-induced charge from the photodiode. The image lag is a phenomenon in which a residual image of the previous pixel image is left after a reset operation is completed since part of a photo-induced charge accumulated until the reset operation is started is left after the reset operation is completed. The fixed pattern noise is caused by different detection voltages of the pixels due to different characteristics (typically, different threshold voltages) of amplifier transistors when the photo-induced charge accumulated in each pixel is detected through the amplifier transistor provided in each pixel.

On the other hand, general image capturing and processing devices employ an analog-to-digital converter for converting an analog output voltage of each pixel to a digital value.

FIG. 2 is a circuit diagram showing a general CMOS image sensor that includes an analog-to-digital converter in each column of pixels.

As shown in FIG. 2, the CMOS image sensor includes an array of pixels 8, each of which includes a photodiode and an amplifier, a row controller 2 and a column controller 4. In addition, an analog-to-digital converter 6 is provided for each column of pixels to convert an analog voltage output of a pixel 8 in the column and in a row selected by the row controller 2 to a digital value. An optical detection signal of a pixel 8 in a column selected by the column controller 4 is output after being converted to a digital image signal through an analog-to-digital converter 6 corresponding to the selected column.

When compared to a CMOS image sensor including a single analog-to-digital converter for signal conversion of all pixels, the CMOS image sensor of FIG. 2 configured as described above is advantageous in that the analog-to-digital converter is easy to design and the conversion speed is high.

However, since the columns provide different pixel outputs under the same conditions due to different characteristics of the analog-to-digital converters 6, there is a need to provide a method for compensating for the pixel output difference.

One conventional compensation technique employs Correlated Double Sampling (CDS) that uses a pin diode to reduce the reset noise as well known in the art. However, this technique requires an additional design and manufacturing process for forming the pin diode and also requires a high driving voltage.

Another compensation technique employs a circuit for controlling a reset voltage in a general photodiode-based pixel to reduce the reset noise. An example of this technique is "active reset readout" proposed by Fowler et al (U.S. Pat. No. 6,424,375), which controls a reset voltage through feedback amplification in each pixel to reduce the reset voltage.

B. Pain et al have also proposed a method for attenuating the noise voltage through the feedback operation in a paper "Reset noise suppression in two-dimensional CMOS photodiode pixels through column-based feedback-reset" in 2002 IEEE International Electron Devices Meeting.

The conventional methods described above may be effective in reducing the reset noise and the image lag. That is, since the conventional methods do not perform the compensation after the analog-to-digital conversion, the conventional methods reduce the reset noise or noise factors such as the image lag, but they require a decrease by at least a threshold voltage in the final reset voltage, as compared to the conventional reset voltage, thereby reducing the range of output signals, and also cannot simultaneously suppress the fixed pattern noise that may subsequently occur in the analog-to-digital converter, etc.

SUMMARY OF THE INVENTION

Therefore, the present invention has been made in view of the above problems, and it is an object of the present invention to provide a CMOS image sensor that controls a reset voltage to reduce reset noise caused by a reset operation of the CMOS image sensor, fixed pattern noise caused by different characteristics of detection circuits, and image lag caused by the influence of a previous image signal upon the current output signal, thereby achieving a high signal to noise ratio.

In accordance with the present invention, the above and other objects can be accomplished by the provision of a CMOS image sensor comprising a photodiode, a reset switch for removing a photo-induced charge accumulated on the photodiode, an amplifier for detecting a pixel output voltage based on the photo-induced charge accumulated on the photodiode, and a selection switch for outputting the voltage detected by the amplifier, wherein the photodiode, the reset switch, the amplifier, and the selection switch are formed on a substrate through a CMOS manufacturing process, the CMOS image sensor further comprising a current source for regularly decreasing a node voltage of the photodiode; a comparator for comparing an output voltage of the amplifier with a reference voltage for controlling the current source to reset the photodiode; and a memory for storing a digital value corresponding to the reference voltage.

Preferably, the CMOS image sensor further comprises a counter for sequentially outputting a digital value; and a digital-to-analog converter for converting the digital value output from the counter to an analog value having the reference voltage.

Preferably, the digital value output from the counter is input, as the digital value corresponding to the reference value, to the memory.

Preferably, the current source comprises a buffer transistor with a constant gate voltage being applied thereto; a capacitor having one end connected to a source of the buffer transistor; a voltage source for supplying a regularly varying voltage, the voltage source being connected to the other end of the capacitor; and a current on/off switch for controlling the buffer transistor based on an output value of the comparator, the current on/off switch being connected to the source of the buffer transistor.

The current source, which can regularly decrease the node voltage (for example, cathode voltage) of the photodiode, is turned on or off according to the comparison between the pixel output voltage and the reference voltage, which is performed by the comparator, so that the reset voltage reaches a desired reference voltage, and a digital image signal is also obtained based on a digital value corresponding to the reference voltage stored in the memory, thereby suppressing not only the reset noise caused by the reset operation but also the fixed pattern noise caused by the difference in the characteristics of the detection circuits.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
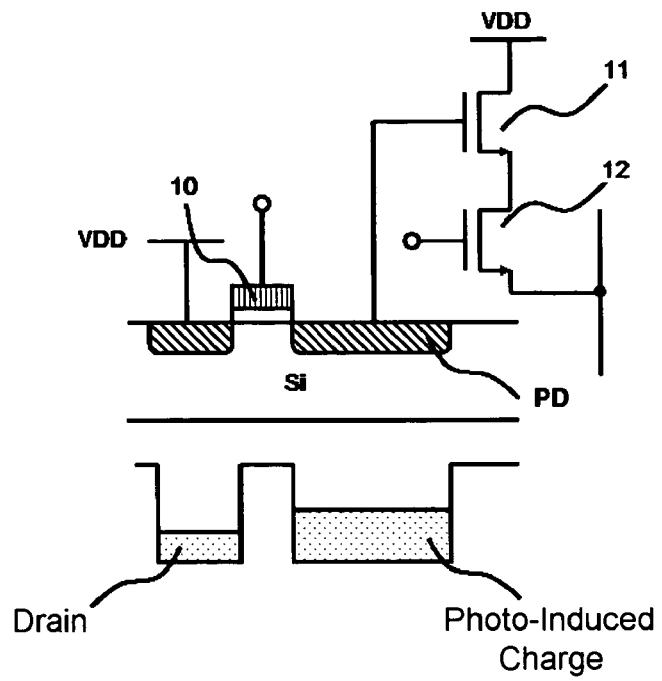
FIG. 1 is a circuit diagram showing the configuration of each pixel circuit in a general CMOS image sensor.

Preferred embodiments of the present invention will now be described with reference to the drawings. The preferred embodiments are provided only for illustrative purposes without limiting the scope of the present invention. In the drawings, the same or similar elements are denoted by the same reference numerals even though they are depicted in different drawings.

Figure 3:
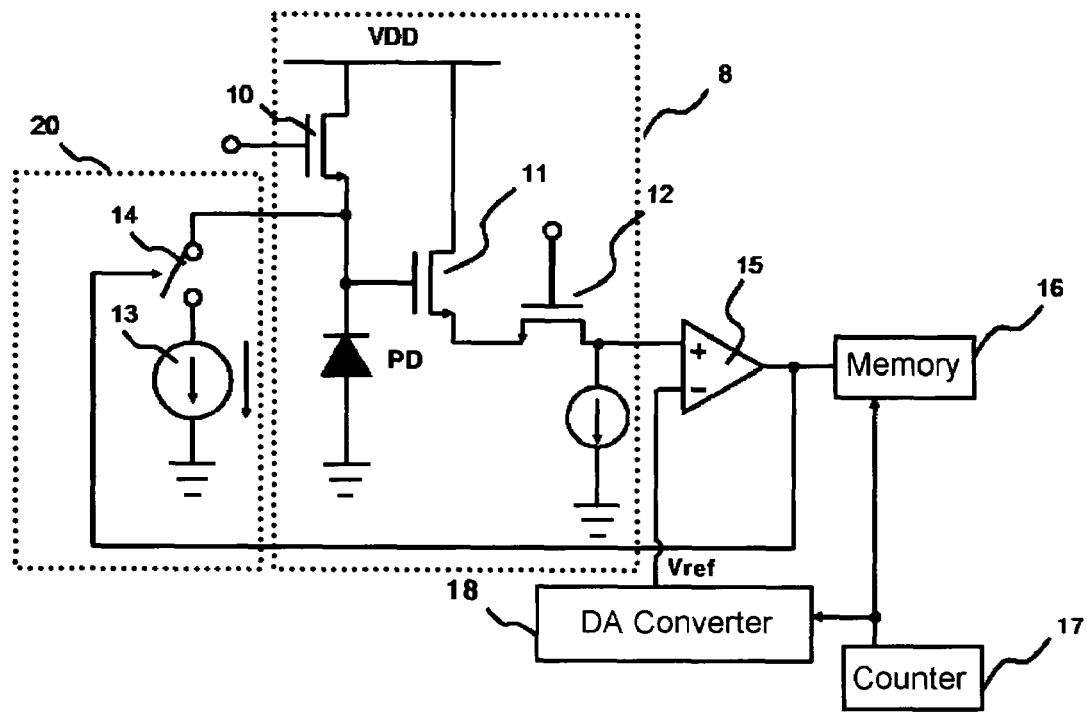
FIG. 3 is a circuit diagram schematically showing a detection circuit and a pixel circuit in a CMOS image sensor according to the present invention.

FIG. 3 is a circuit diagram schematically showing a detection circuit and a pixel circuit in a CMOS image sensor according to the present invention.

As shown in FIG. 3, a pixel 8 of the CMOS image sensor according to the present invention includes a photodiode PD for collecting photo-induced charges according to the intensity of incident light, a reset switch 10 for removing the collected charges and resetting the photodiode PD, an amplifier 11 for outputting a pixel voltage of the photodiode PD, and a selection switch 12 for selecting the corresponding pixel 8 in an array of pixels.

The pixel 8 is coupled to a current source unit 20 for regularly decreasing the voltage of a node (for example, a cathode) of the photodiode PD. The current source unit 20 includes a current source 13 for supplying a constant current, and a current on/off switch 14 connected between the current source 13 and the photodiode node to connect or disconnect the current source 13 to or from the pixel 8.

After passing through the amplifier 11, the pixel voltage of the photodiode PD is input to a comparator 15. Together with the pixel voltage, a reference voltage Vref is input to the comparator 15, which detects the difference between the pixel voltage and the reference voltage Vref, and controls the current source unit 20 to reset the photodiode PD.

The reference voltage Vref to be input to the comparator 15 is produced in the following manner. A digital-to-analog converter 18 converts digital signals sequentially output from a counter 17 to analog signals having reference voltages Vref to be sequentially input to the comparator 16. According to the output of the comparator 15, a memory 16 stores a digital value output from the counter 17, so that a digital image signal having the digital value is output.

The operation of the CMOS image sensor according to the present invention will now be described in detail.

First, the reset switch 10 is turned on, allowing the node of the photodiode PD to have an initial voltage at a predetermined level. A noise voltage occurring when the reset switch 10 is turned on is the same as a noise voltage appearing in a reset voltage of a conventional image sensor. That is, the noise voltage is included in the reset voltage.

Next, a predetermined initial reference voltage Vref is applied to the comparator 15. The initial reference voltage Vref is set to a voltage slightly lower than an expected output voltage of the pixel 8 so that the output of the comparator 15 is high.

If the reset switch 10 is turned off in this state, the node voltage of the photodiode PD is regularly decreased due to the current source 13 in the current source unit 20. Thereafter, at the moment when the pixel output voltage becomes lower than the reference voltage Vref applied to the comparator 15, the output of the comparator 15 becomes low, thereby turning off the current on/off switch 14. As the current on/off switch 14 is turned off, the current source unit 20 is separated from the photodiode PD, so that the pixel output voltage no longer varies.

Thereafter, the selection switch 12 for allowing or preventing the output of the pixel voltage is turned off, and photo-induced charges according to incident light are then accumulated until the selection switch 12 is turned on. As the selection switch 12 is turned on, the pixel voltage of the photodiode PD is detected through the amplifier 11.

Figure 2:
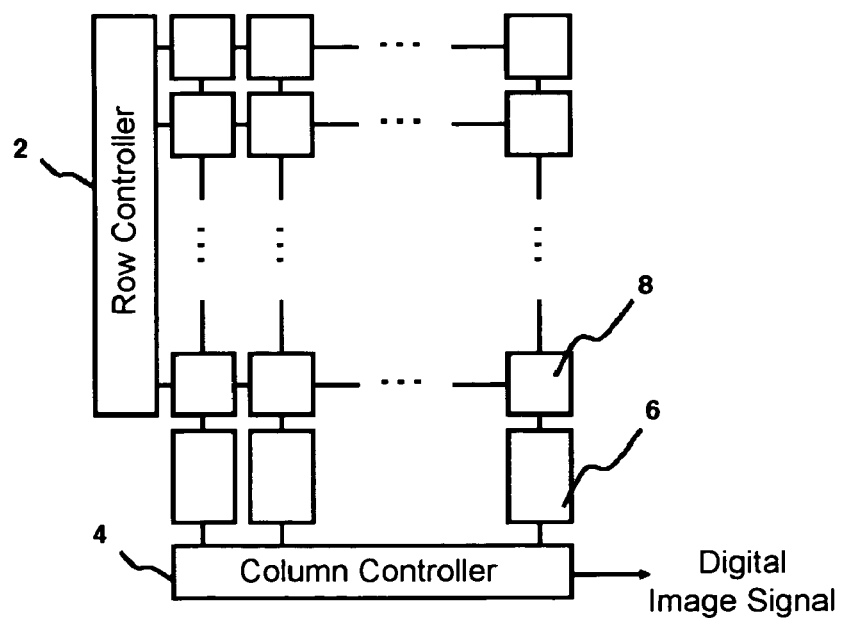
FIG. 2 is a circuit diagram showing a general CMOS image sensor that includes an analog-to-digital converter in each column of pixels.

A row controller 2 as shown in FIG. 2 selects the pixel 8 from an array of pixels by turning on the selection switch 12 corresponding to the pixel 8.

The CMOS image sensor according to the present invention has an analog-to-digital conversion structure using the comparator 15, the digital-to-analog converter 18, the counter 17 and the memory 16. Specifically, the pixel voltage is applied to the comparator 15, and the reference voltage Vref output from the digital-to-analog converter 18 sequentially varies as the counter 17 runs. A value of the counter 17 at the moment when the output of the comparator 15 is changed is stored in and read from the memory 16, thereby achieving analog-to-digital conversion.

When the output of the comparator 15 is high, the memory 16 is updated with the output value of the counter 17, and when the output of the comparator 15 is low, the memory 16 is not updated therewith, whereby the analog pixel voltage is converted to a corresponding digital value.

Such an analog-to-digital conversion scheme, which does not use a conventional analog-to-digital converter, has the following advantages.

The initial reset voltage is regularly decreased through the current source 20 while the pixel voltage output is controlled using the same comparator 15 as used for the analog-to-digital conversion, thereby making it possible to reduce the image lag phenomenon and the reset noise caused by the reset operation.

When the same reference voltage is input to the comparators 15 of the pixels, the reset voltage is determined at the moment when the output state of the comparators 15 is changed, irrespective of the difference between the characteristics of the comparators 15 or the amplifiers 11 of the pixels. This causes no difference between output voltages of the pixels, which pass through different amplifiers 11 and comparators 15 in a single image sensor, thereby making it possible to reduce the fixed pattern noise.

Figure 4:
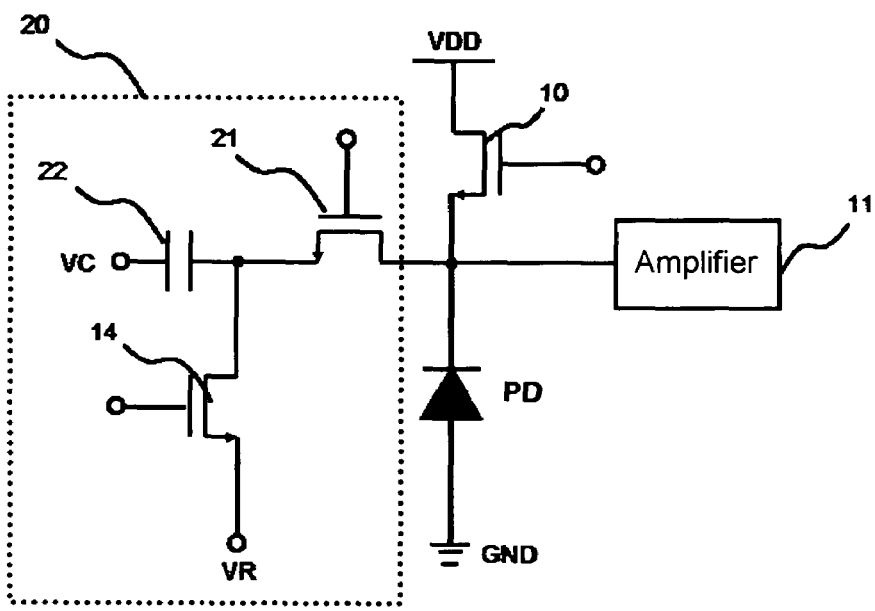
FIG. 4 is a circuit diagram showing an example pixel including a controllable current source unit that can be applied to a CMOS image sensor according to the present invention.

FIG. 4 is a circuit diagram showing an example pixel including a controllable current source unit that can be applied to a CMOS image sensor according to the present invention.

As shown in FIG. 4, the pixel includes a reset switch 10, a photodiode PD, an amplifier 11, a buffer transistor 21, a capacitor 22, a voltage source VC, and a current on/off switch 14. The reset switch 10 is used to remove photo-induced charges collected on the photodiode PD. The buffer transistor 21 receives a constant gate voltage and is used as a current source for regularly decreasing the node voltage of the photodiode PD. One end of the capacitor 22 is connected to the source of the buffer transistor 21. The voltage source VC is connected to the other end of the capacitor 22 to supply a regularly varying voltage. The current on/off switch 14 is connected to the source of the buffer transistor 21 to control the buffer transistor 21 according to the output value of the comparator 15.

When the reset operation is started, the reset switch 10 and the current on/off switch 14 are turned on, and voltages VDD and GND are applied to the voltage source and reference voltage nodes VC and VR, respectively. A suitable gate voltage is applied to the buffer transistor 21 so that it operates as a current source.

In order for the buffer transistor 21 to operate as a current source of the current source unit 20 for providing a constant current, a constant voltage must be applied between the gate and source of the buffer transistor 21. To accomplish this, the current on/off switch 14 is turned off and the reference voltage VR is changed to VDD. Thereafter, if the voltage from the voltage source VC regularly decreases, the source voltage of the buffer transistor 21 is fixed so that a current, determined based on the product of the capacitance of the capacitor 22 and the rate of decrease in the voltage from the voltage source VC, flows through the buffer transistor 21.

Here, if the reset switch 10 is turned off, the node voltage of the photodiode PD is gradually decreased due to the constant current flowing through the buffer transistor 21.

If it is detected through the comparator 15 that the voltage of the photodiode PD reaches a predetermined initial voltage, the current on/off switch 14 is turned on, and the source voltage of the buffer transistor 21 rises, whereby the amount of the constant current flowing through the buffer transistor 21 is reduced to zero. Here, since the gate voltage of the buffer transistor 21 is fixed, parasitic capacitance of the buffer transistor 21, etc., causes no change in the node voltage of the photodiode PD.

The transistor current used as a current source generally has 1/f noise, which contains higher energy in the lower frequencies than in the higher frequencies, and white noise, which has equal energy at all frequencies.

However, in the embodiment of FIG. 4, the noise voltage in the reset operation gradually decreases as the frequency increases since the current of the buffer transistor 21 is coupled to the capacitance of the node of the photodiode PD.

Accordingly, if the bandwidth and the noise level of the comparator 15 and the amplifier 11 for detecting the node voltage of the photodiode PD are sufficiently high, the pixel can have reset noise at a level lower than the reset noise in the conventional pixel.

Figure 5:
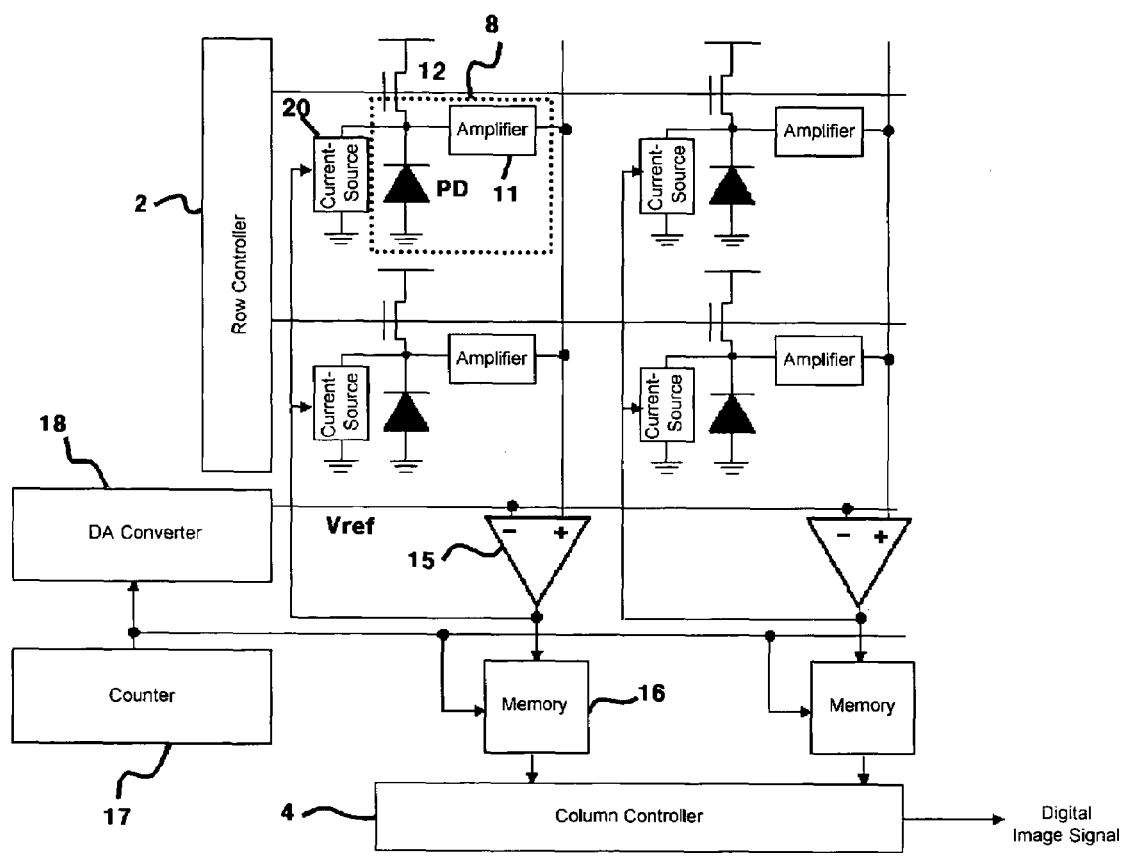
FIG. 5 is a circuit diagram schematically showing the overall configuration of a CMOS image sensor according to the present invention.

FIG. 5 is a circuit diagram schematically showing the overall configuration of a CMOS image sensor according to the present invention.

The CMOS image sensor is composed of an array of pixels 8, each of which includes a controllable current source 20 as shown in FIG. 5.

A comparator 15 and a memory 16 are provided in each column. In addition, a counter 17 and a digital-to-analog converter 18 are provided to apply a reference voltage Vref to the comparator 15, so that analog-to-digital conversion is performed without a conventional analog-to-digital converter.

As apparent from the above description, the present invention provides a CMOS image sensor that controls a reset voltage to reduce reset noise caused by a reset operation of the CMOS image sensor, fixed pattern noise caused by different characteristics of detection circuits, and image lag caused by the influence of a previous image signal upon the current output signal, thereby achieving a high signal to noise ratio.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A CMOS image sensor comprising a photodiode, a reset switch for removing a photo-induced charge accumulated on the photodiode, an amplifier for detecting a pixel output voltage based on the photo-induced charge accumulated on the photodiode, and a selection switch for outputting the voltage detected by the amplifier, wherein the photodiode, the reset switch, the amplifier, and the selection switch are formed on a substrate through a CMOS manufacturing process, the CMOS image sensor further comprising:

a current source for regularly decreasing a node voltage of the photodiode;

a comparator for comparing an output voltage of the amplifier with a reference voltage for controlling the current source to reset the photodiode; and a memory for storing a digital value corresponding to the reference voltage, wherein the current source comprises:

a buffer transistor with a constant gate voltage being applied thereto;

a capacitor having one end connected to a source of the buffer transistor;

a voltage source for supplying a regularly varying voltage, the voltage source being connected to the other end of the capacitor; and a current on/off switch for controlling the buffer transistor based on an output value of the comparator, the current on/off switch being connected to the source of the buffer transistor.

2. The sensor according to claim 1, further comprising:

a counter for sequentially outputting a digital value; and a digital-to-analog converter for converting the digital value output from the counter to an analog value having the reference voltage.

3. The sensor according to claim 2, wherein the digital value output from the counter is input, as the digital value corresponding to the reference value, to the memory.

* * * * *